Figure 1:
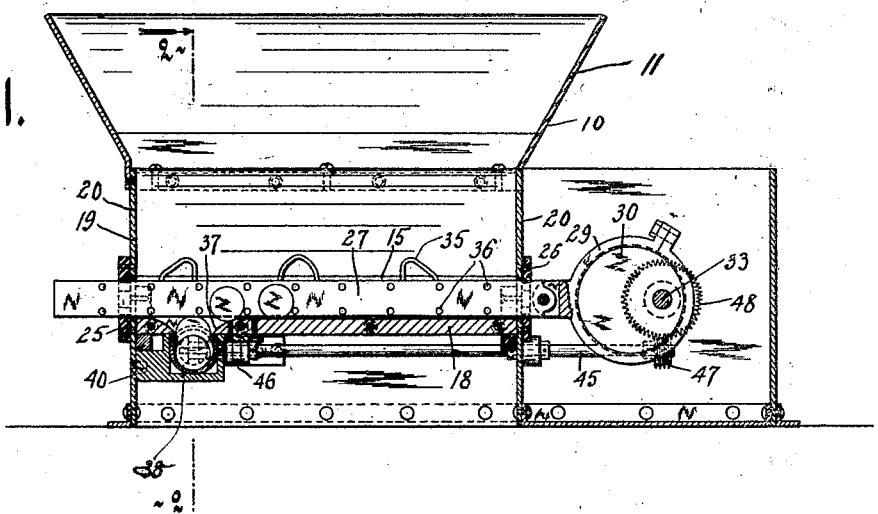

B. SZABO.
FEEDING ATTACHMENT FOR MACHINES FOR MANUFACTURING BOTTLE CLOSURES.
APPLICATION FILED MAR. 9, 1915. RENEWED JUNE 16, 1916.

1,199,316.

Patented Sept. 26, 1916.
2 SHEETS—SHEET 1.

WITNESSES

INVENTOR
B. Szabó
BY
his ATTORNEY

B. SZABÓ.
FEEDING ATTACHMENT FOR MACHINES FOR MANUFACTURING BOTTLE CLOSURES.
APPLICATION FILED MAR. 9, 1915. RENEWED JUNE 16, 1916.

1,199,316.

Patented Sept. 26, 1916.
2 SHEETS—SHEET 2.

WITNESSES

INVENTOR
B. Szabó
BY
his ATTORNEY

UNITED STATES PATENT OFFICE.

BERTALAN SZABÓ, OF NEW YORK, N. Y., ASSIGNOR TO A. JOHNSON, OF BROOKLYN, NEW YORK.

FEEDING ATTACHMENT FOR MACHINES FOR MANUFACTURING BOTTLE-CLOSURES.

1,199,316.

Specification of Letters Patent.

Patented Sept. 26, 1916.

Application filed March 9, 1915, Serial No. 13,246. Renewed June 16, 1916. Serial No. 104,098.

*To all whom it may concern:*

Be it known that I, BERTALAN SZABÓ, a subject of the King of Hungary, and a resident of the city of New York, in the county of Kings and State of New York, have invented certain new and useful Improvements in Feeding Attachments for Machines for Manufacturing Bottle-Closures, of which the following is a specification.

The present invention relates to an attachment to machines for manufacturing closures for bottles, cans and the like, including those termed "crown corks."

More particularly the invention relates to means for feeding the sealing disks of cork or similar material, of the closures to the assembling devices of the machine. Upon these assembling machines there is usually provided a vertically extending tube, into which the sealing disks are placed either manually or automatically so as to occupy horizontal positions one on top of another, and from which they are transported, one after the other, to the assembling means.

Heretofore there has been devised feeding means which causes disks to pass from a mass in a hopper to the inlet of the tube mentioned, but, as far as known, no automatic means has been provided which prevents clogging of the inlet, or which causes the disks to be properly stacked in the tube.

One of the objects of the present invention is to provide a simple and efficient feeding attachment which automatically delivers sealing disks from a mass to a tube, leading to the assembling machine, said means preventing a clogging of the inlet to the tube and causing the disks to occupy horizontal positions within the said tube.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 3:
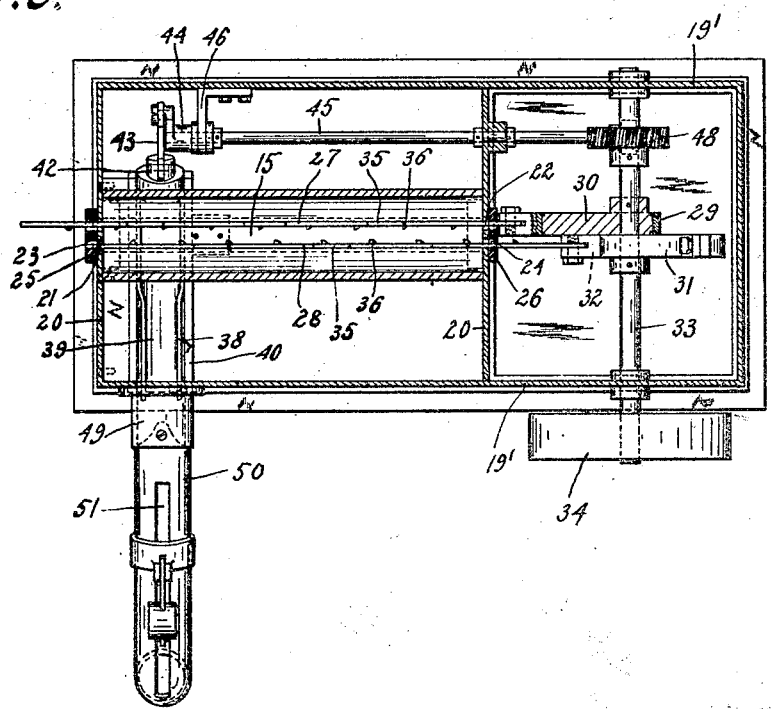
Figure 2:
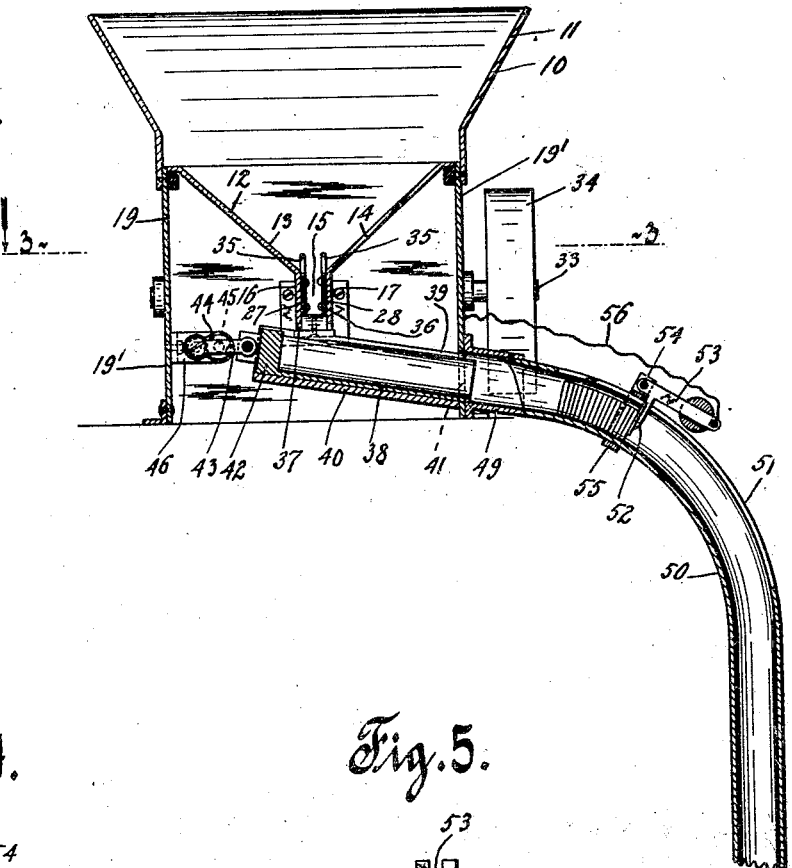
Figure 4:
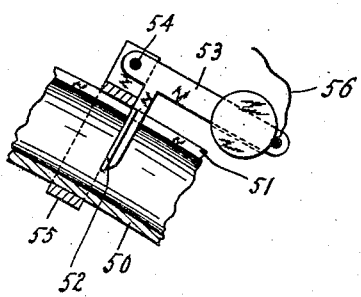
Figure 5:
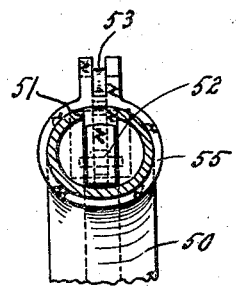

Figure 1 is a central vertical section taken through a feeding attachment constructed in accordance with the present invention; Fig. 2 is a section taken on line 2—2 of Fig. 1; Fig. 3 is a section taken on line 3—3 of Fig. 2; Fig. 4 is a vertical section taken through the means for causing a proper initial filling of the tube leading to the assembling machine; and Fig. 5 is a rear elevation of the detail shown in Fig. 4.

In the drawings, the numeral 10 indicates a rectangular hopper, into which are placed the sealing disks for supplying the assembling machine, said hopper being arranged above the frame or table of the machine and supported by any suitable means (not shown). This hopper comprises, for reasons well known, slanting sides 11 and a bottom 12, the latter consisting of two sections 13 and 14, which slope toward the longitudinal center line thereof, in which is formed in said bottom a groove 15 of considerable depth. The groove runs horizontally throughout the length of the bottom, and is formed by vertical sides 16 and 17, and a horizontal bottom 18. The entire structure is placed upon a box-like casing 19, the ends 20 of which form at the same time the ends of the bottom 12 and its groove. Adjacent to the sides 16 and 17 of the groove 15 are formed in the ends 20 of the box-like casing 19 registering rectangular apertures 21 and 22, said apertures being in alinement with openings 23 and 24 in guide blocks 25 and 26, respectively, the latter being attached in any suitable manner to the outer surface of the casing 19. Through these apertures and openings extend two flat bars 27 and 28, one of said bars abutting against the side 16 of the groove 15, and the other one against the side 17 thereof. The height of each of these bars is the same as that of the groove 15. The bars are reciprocably disposed in the groove, their movement being guided by the blocks 25 and 26 above mentioned. The bar 27 is pivoted to the strap 29 of an eccentric 30, and the bar 28 to the strap 31 of an eccentric 32. The two eccentrics are keyed, or otherwise fixedly attached, to a driving shaft 33, the latter being rotatably journaled in the sides 19' of the casing 19. The eccentrics 30 and 32 are staggered 180°, whereby, obviously, the bars 27 and 28 are caused to move always in opposite directions. Rotation is imparted to the driving shaft 33 by a belt (not shown), running over a pulley 34, that is keyed to the driving shaft, the belt receiving motion from any suitable means. To the upper faces of the bars 27 and 28 are attached upwardly projecting agitating arms 35, and to their inner faces teeth or projections 36, for a purpose hereinafter to be described.

The disks are advanced within the groove 15 in a manner hereinafter to be described toward the front end of the casing 19, and drop there through a discharge opening 37 in the bottom of the groove into an inclined reciprocating tubular member 38, that is provided with a slot 39, extending throughout the length of its upper portion, and being of a width immediately below the opening 37 that is somewhat greater than the diameter of a sealing disk, said width decreasing toward the outlet of the member 38. The inner diameter of the tubular member 38 is greater than the diameter of a sealing disk. The tubular member 38 is reciprocated in a guide 40, that is secured to the casing 19 in alinement with an aperture 41 in one of the sides 19' of said casing. The rear end of the tubular member 38 is closed by a head 42, that is connected by means of a pitman 43 with a crank 44, the latter being keyed to a shaft 45, that is rotatably mounted in a bearing 46 and in one of the ends 20 of the casing 19. Rotation is imparted to the shaft 45 from the main driving shaft 33, for instance there is fastened to the shaft 45 a worm 47 in mesh with a worm gear 48, the latter being attached to the shaft 33. With the aperture 41 communicates a tubular fitting 49, the longitudinal axis of said fitting coinciding with that of the tubular reciprocating member 38. From the fitting 49 leads a tube 50 to the transporting means upon the assembling machine, which conveys the sealing disks, one after the other, to the assembling means. The upper portion of this tube is curved, its lower portion being substantially vertical. In the curved portion of the tube is formed a slot 51. Through this slot is adapted to project into the tube a finger 52 of a weighted lever 53, the said lever being pivoted at 54 to a ring 55, that embraces the tube 50. The weighted end of the lever 53 is connected by a flexible connection 56 with some stationary part of the hopper.

The operation of this device is as follows: A mass of sealing disks is placed into the hopper, and rotation is imparted by the intermediary of the driving pulley 34 to the shaft 33, whereby the bars 27 and 28 are reciprocated, and so also the tubular member 38. The arms 35 upon the said bars agitate the disks, and cause them to drop into the groove 15. The reciprocating bars 27 and 28 keep the disks in the groove by means of their teeth, or projections 36 continuously in motion, a bar, moving toward the reciprocating tubular member 38, feeding a number of disks at the stroke toward the tubular member through the discharge opening 37 into the tubular member 38. It is to be observed that the ratio of the worm gear 48 and the worm 47 is such that even at a slow speed of the shaft 33 a vibrating motion will be imparted to the tubular member 38, such vibration causing the disks to move toward the aperture 41 in the side 19' of the casing 19, and through the said aperture into the tube 50. The crank 44 is of such size and the head 42 of the tubular member 38 is disposed in such relation to the discharge opening 37 that, in the rotation of the crank, the said head alternately opens and closes the said opening. For this reason the flow of the disks into the tubular member 38 will be intermittent, whereby clogging of the inlet to the tube 50 will be effectively prevented. Due to the vibrating motion of the tube 38, the feeding of the disks to the tube 50 will be positive, and inasmuch as the said tubular member is inclined toward the said tube, the disks will be stacked one on top of another within the tube.

Before starting the operation of the feeding means, the operator brings the weighted lever 53 into the position shown in Fig. 2 of the drawings, in which its finger 52 projects through the slot 51 into the tube. The friction between the ring 55 and the outer face of the tube is sufficient to keep the ring in position upon the curved portion of said tube. As now the feeding of the disks is started, the weight of the disks in the tube 50 causes the ring 55 and the weighted lever carried thereby to move downward until the flexible connection 56 is drawn taut, whereby the finger 52 is withdrawn from the tube. The disks will then slide down into the vertical portion of the tube. The weighted lever performs thus automatically an operation which has heretofore been done in starting the feeding operation manually, to wit: the insertion and keeping of a pointed instrument in the tube until a suitable quantity of disks has been fed thereinto.

What I claim is:—

1. In a device of the character described, the combination with a hopper adapted to receive a mass of sealing disks and having a discharge opening in its bottom, agitating means in the hopper operative to cause the disks therein to move toward the discharge opening, a tube communicating with the discharge opening and arranged to receive the disks passing therethrough, and impelling means disposed below said discharge opening at the entrance to said tube and in alinement with the longitudinal axis thereof and operative to transport disks falling through said discharge opening to said tube.

2. In a device of the character described, the combination with a hopper adapted to receive a mass of sealing disks and having a discharge opening in its bottom, two oppositely movable members in the hopper coöperative to cause the disks therein to move toward the discharge opening, and a tube communicating with the discharge opening and arranged to receive disks passing therethrough.

3. In a device of the character described, the combination with a hopper adapted to receive a mass of sealing disks and having a discharge opening in its bottom, two oppositely reciprocating bars in the hopper for causing the disks therein to move toward the discharge opening, and a tube communicating with the discharge opening and arranged to receive disks passing therethrough.

4. In a device of the character described, the combination with a hopper adapted to receive a mass of sealing disks having a groove in its bottom, the bottom of said groove being provided with a discharge opening, reciprocating means for causing the disks in said groove to move toward the discharge opening, and a tube communicating with the discharge opening and arranged to receive disks passing therethrough.

5. In a device of the character described, the combination with a hopper adapted to receive a mass of sealing disks and having a groove in its bottom, the bottom of the groove being provided with a discharge opening, a reciprocating bar in the groove for causing the disks in said groove to move toward the discharge opening.

6. In a device of the character described, the combination with a hopper adapted to receive a mass of sealing disks and having a groove in its bottom, the bottom of the groove being provided with a discharge opening, two reciprocative bars in the groove, and means for simultaneously reciprocating the bars in opposite directions to cause the disks in said groove to move toward the discharge opening.

7. In a device of the character described, the combination with a hopper adapted to receive a mass of sealing disks and having a discharge opening in its bottom, two oppositely reciprocating bars in the hopper for causing the disks therein to move toward the discharge opening, each bar being provided with agitating projections, and a tube communicating with the discharge opening and arranged to receive disks passing therethrough.

8. In a device of the character described, the combination with a hopper adapted to receive a mass of sealing disks and having a groove in its bottom, the bottom of the groove being provided with a discharge opening, two reciprocative bars in the groove, each bar being provided with projections on its upper edge and its inner face, and means for simultaneously reciprocating the bars in opposite directions to cause the disks in said groove to move toward the discharge opening.

9. In a device of the character described, the combination with a hopper adapted to receive a mass of sealing disks having a groove in its bottom, the bottom of said groove being provided with a discharge opening, means for causing the disks in said groove to move toward the discharge opening, a tube for receiving the disks, and impelling means disposed below said discharge opening and in alinement with the longitudinal axis of said tube for transporting disks falling through said discharge opening to said tube.

10. In a device of the character described, the combination with a hopper adapted to receive a mass of sealing disks having a groove in its bottom, the bottom of said groove being provided with a discharge opening, reciprocating means for causing the disks in said groove to move toward the discharge opening, a tube for receiving the disks, and means disposed below said discharge opening and in alinement with said tube for transporting disks falling through said discharge opening to said tube.

11. In a device of the character described, the combination with a hopper adapted to receive a mass of sealing disks having a groove in its bottom, the bottom of said groove being provided with a discharge opening, reciprocating means for causing the disks in said groove to move toward the discharge opening, a tube for receiving the disks, and means disposed below said discharge opening and in alinement with said tube for transporting disks falling through said discharge opening to said tube, said first named means serving at the same time to agitate the mass of disks in said hopper.

12. In a device of the character described, the combination with a hopper adapted to receive a mass of sealing disks having a groove in its bottom, the bottom of said groove being provided with a discharge opening, means for causing the disks in said groove to move toward the discharge opening, a tube for receiving the disks, and reciprocating means disposed below said discharge opening and in alinement with the longitudinal axis of said tube for transporting disks falling through said discharge opening to said tube.

13. In a device of the character described, the combination with a hopper adapted to receive a mass of sealing disks having a groove in its bottom, the bottom of said groove being provided with a discharge opening, reciprocating means for causing the disks in said groove to move toward the discharge opening, a tube for receiving the disks, and reciprocating means disposed below said discharge opening and in alinement with said tube for transporting disks falling through said discharge opening to said tube.

14. In a device of the character described, the combination with a hopper adapted to receive a mass of sealing disks having a groove in its bottom, the bottom of said groove being provided with a discharge opening, a plurality of reciprocating bars within said groove for causing the disks therein to move toward the discharge opening, a tube for receiving the disks, and means disposed below said discharge opening and in alinement with said tube for transporting disks falling through said discharge opening to said tube.

15. In a device of the character described, the combination with a hopper adapted to receive a mass of sealing disks having a groove in its bottom, the bottom of said groove being provided with a discharge opening, a plurality of reciprocating bars within said groove for causing the disks therein to move toward the discharge opening, a tube for receiving the disks, and reciprocating means disposed below said discharge opening and in alinement with said tube for transporting disks falling through said discharge opening to said tube.

16. In a device of the character described, the combination with a hopper adapted to receive a mass of sealing disks having a groove in its bottom, the bottom of said groove being provided with a discharge opening, a plurality of reciprocating bars disposed within said groove for causing the disks therein to move toward the discharge opening, a tube for receiving the disks, and a tubular reciprocating member disposed below said discharge opening and in alinement with said tube for transporting disks falling through said discharge opening to said tube.

17. In a device of the character described, the combination with a hopper adapted to receive a mass of sealing disks having a groove in its bottom, the bottom of said groove being provided with a discharge opening, means for causing the disks in said groove to move toward the discharge opening, a tube for receiving the disks, and a tubular reciprocating member disposed below said discharge opening and in alinement with said tube for transporting disks falling through said discharge opening to said tube.

18. In a device of the character described, the combination with a hopper adapted to receive a mass of sealing disks having a groove in its bottom, the bottom of said groove being provided with a discharge opening, means for causing the disks in said groove to move toward the discharge opening, a tube for receiving the disks, and a tubular reciprocating member receiving disks falling through said discharge opening and transporting the same to said tube.

19. In a device of the character described, the combination with a hopper adapted to receive a mass of sealing disks having a groove in its bottom, the bottom of said groove being provided with a discharge opening, means for causing the disks in said groove to move toward the discharge opening, a tube for receiving the disks, and a tubular reciprocating member disposed below said discharge opening and in alinement with said tube for receiving disks falling through said discharge opening and transporting the same to said tube.

20. In a device of the character described, the combination with a hopper adapted to receive a mass of sealing disks having a groove in its bottom, the bottom of said groove being provided with a discharge opening, means for causing the disks in said groove to move toward the discharge opening, a tube for receiving the disks, and means disposed below said discharge opening and in alinement with said tube for transporting disks falling through said discharge opening to said tube, said last named means closing and opening alternately said discharge opening.

21. In a device of the character described, the combination with a hopper adapted to receive a mass of sealing disks having a groove in its bottom, the bottom of said groove being provided with a discharge opening, means for causing the disks in said groove to move toward the discharge opening, a tube for receiving the disks, and an inclined tubular reciprocating member receiving disks falling through said discharge opening and transporting the same to said tube.

22. In a device of the character described, the combination with a hopper adapted to receive a mass of sealing disks having a groove in its bottom, the bottom of said groove being provided with a discharge opening, reciprocating means for causing the disks in said groove to move toward the discharge opening, a tube for receiving the disks, and an inclined tubular reciprocating member receiving disks falling through said discharge opening and transporting the same to said tube.

23. In a device of the character described, the combination with a hopper adapted to receive a mass of sealing disks and having a discharge opening in its bottom, agitating means in the hopper operative to cause the disks therein to move toward the discharge opening, a tube communicating with the discharge opening and arranged to receive the disks passing therethrough, and a pivoted finger carried by the tube and arranged to hang in the path of the disks and automatically removable therefrom by a predetermined weight of disks.

24. In a device of the character described, the combination with a hopper adapted to receive a mass of sealing disks and having a discharge opening in its bottom, agitating means in the hopper operative to cause the disks therein to move toward the discharge opening, a tube communicating with the discharge opening and arranged to receive the disks passing therethrough, a ring frictionally embracing the tube, a pivoted finger carried thereby and arranged to hang in the path of the disks, and a stationary abutment for the pivoted finger operative to trip the finger and remove it from the path of the disks as the ring and finger are moved under the weight of the disks.

Signed at New York, in the county of New York and State of New York, this 6th day of March, A. D. 1915.

BERTALAN SZABÓ.

Witnesses:
SIGMUND HERZOG,
ROZA SZABÓ.